Patented Oct. 20, 1953

2,656,400

UNITED STATES PATENT OFFICE 2,656,400

MANUFACTURE OF NEGATIVE PLATES

William D. Carson and Alva L. Hindall, Muncie, Ind., assignors to General Motors Corporation, Detroit, Mich., a corporation of Delaware No Drawing. Application June 28, 1951,
Serial No. 234,164

5 Claims. (Cl. 136—33)

This invention relates to storage batteries and is particularly concerned with a method for the accelerated aging of negative pasted plates for use in said storage batteries.

In our copending application Serial No. 234,032, filed concurrently herewith, a method for curing positive pasted plates is disclosed. The present invention is directed to a method for effecting a satisfactory cure of the negative pasted plates.

It is, therefore, the basic object of this invention to provide a method of curing pasted negative plates wherein the product is uniform and extremely rugged and wherein the cure is effected in a reduced time period over prior art processes.

In carrying out the above object, it is a further object of the invention to provide a method for accelerated aging of negative plates, under steam pressure, wherein the pressure and temperature are controlled for obtaining the desired results.

A still further object of the invention is to provide a method for pressure curing the negative pasted plate wherein the ruggedness of the plate is obtained by actually bonding the active material of the grid paste onto the grid as will be explained hereinafter.

Further objects and advantages of the present invention will be apparent from the following description.

In our copending application Serial No. 234,032, a curing process is set forth wherein pasted plates are cured in a controlled volume oven to reduce the moisture content of the plate and to oxidize some of the metallic lead. The plates, after curing, have about 9% moisture therein which is not a critical figure from the curing standpoint but which is a desired figure for commercial operations as discussed in detail in said copending application.

In the present invention, the negative plates are treated in the same manner. These plates are pasted with a starting mixture of red litharge, yellow litharge and metallic lead in the ratio of about 30 to 45 to 25 and sulphuric acid. This paste, after mixing, includes about 30% red litharge, 55% of colloidal or semi-colloidal lead compounds believed to be basic lead sulphate and hydrated lead compounds and about 15% metallic lead. The pasted plate is then cured by the method disclosed in the copending application Serial No. 234,032. After the cure, it has been found that the red litharge increases to about 35% with a drop in metallic lead to about 10%, basic lead sulphate 40% and hydrated lead compounds 15%. Plates coming out of this cure run about 9% moisture which makes them suitable for stacking and sufficiently rugged for break-apart since the plates are generally cured in double sections. These plates are, therefore, the starting point of the present process.

In this process, we age these cured plates to obtain a reduction in moisture content to approximately 4½%. This may be done in air or under accelerated conditions, but we prefer the air aging because of cost. In this connection, we merely stack the broken apart plates having a 9% moisture on a skid and permit them to stand in air for about 24 hours or until the moisture content has dropped to approximately 4½% ± ½%. Obviously, this period will vary in accordance with ambient temperature and humidity but under normal conditions a 24 hour age will bring the moisture content to the desired figure. During this aging, the red litharge increases to about 40%, the basic lead sulphate and hydrated lead compounds remain the same and the metallic lead drops to a figure of 5%. In this connection, it should be understood that all the figures given may vary slightly, these examples merely being illustrative of a pasted plate cured and aged under the optimum conditions. These aged plates are next pressure cured in an autoclave. The pressure and time vary inversely. We find that a 30 minute cure at 30 pound steam pressure yields highly satisfactory results. However, if the pressure is dropped to 5 pounds, the time required is 32 hours whereas if the pressure is increased to 60 pounds, the time is reduced to 6 minutes. Thus we are not limited to any specific pressure and time other than the fact that the cure must be in steam under pressure and for a time sufficient to obtain the desired results which are a reformation of yellow litharge which comes about through reaction of the hydrated lead compounds. Thus the formula of the pressure cooked paste resolves itself to about 40% red litharge, 15% yellow litharge, 40% basic lead sulphate in colloidal form and 5% metallic lead.

The increased ruggedness of the pressure cured negative plate paste may be explained as follows: The pressure curing of the plate paste results in improved adhesion between the pasted material and the grid. This is explained by the fact that the basic lead sulphate actually attacks the grid material (usually lead or lead alloys, such as lead-antimony alloys), thus forming an actual chemical bond between the paste and the grid. The high temperature used in the pressure cure accelerates this reaction and the steam which is present prevents the active material from drying out and thus maintains a moist alkaline condition which aids in the grid corrosion, thereby resulting in the strong adhesion. Furthermore, the pressure cooking of the negative plate actually causes a recrystallization of the yellow litharge which appears to be another cause for the extreme ruggedness of the plate since this recrystallization results in an interlocking of crystal grains or a diffusion of one crystal into another across grain boundaries to form a mechanical bond or interlock.

From the foregoing, it will be seen therefore that the steam cured negative plate paste is mechanically locked together by the recrystallizd yellow litharge and is chemically adhered to the surface of the grid by the reaction of the basic lead sulphate and the grid material. These induced conditions are believed to be the reason for the extreme ruggedness of the negative plate when cured by the method disclosed herein. This method provides a very improved plate over prior art plates wherein no pressure cure is utilized since we believe that in these prior art plates, there is considerably less chemical reaction from the bond standpoint and so far as we can determine, there is no recrystallization to provide a mechanical interlock.

In all of the foregoing disclosure, it is to be understood that the colloidal lead compounds have been assumed to be basic lead sulphate and hydrated lead compounds.

X-ray patterns of the material bear out this assumption to a large extent.

Further, the exact percentages may vary according to reaction efficiency and conditions, however, the figures noted are examples of a typical reaction in the processes set forth.

While the embodiments of the present invention as herein disclosed, constitute preferred forms, it is to be understood that other forms might be adopted.

What is claimed is as follows:

1. In a method for curing negative pasted plates wherein the initial paste consists of a mixture of red litharge, basic lead sulphate, hydrated lead compounds and metallic lead pasted onto a lead alloy grid and wherein the paste mixture has an initial moisture content of about 13%, the steps comprising; heating the plate in a confined space so that the paste is soaked in a moisture ladened atmosphere provided by moisture being driven from the plate paste, progressively increasing the temperature of heat to a point that the plate paste is reduced in moisture content to about 9%, aging the plates in air for a time sufficient to reduce the moisture content to about 4½% and then pressure curing the plates in a closed chamber with steam under pressures ranging from 5 to 60 pounds per square inch and for a time ranging from 32 hours to 6 minutes for forming a strong and rugged plate.

2. In a method for curing negative pasted plates wherein the initial paste consists of a mixture of red litharge, basic lead sulphate, hydrated lead compounds and metallic lead pasted onto a lead alloy grid and wherein the paste mixture has an initial moisture content of about 13%, the steps comprising; soaking the plate in a confined space and under progressively increasing temperatures until the plate paste is reduced in moisture content to about 9% and then aging the plates in air for a time sufficient to reduce the moisture content to about 4½% and then pressure curing the plates in a closed chamber with steam under pressures ranging from 5 to 60 pounds per square inch and for a time ranging from 32 hours to 6 minutes for forming a strong and rugged plate.

3. In a method for curing negative pasted plates wherein the initial paste consists of a mixture of red litharge, basic lead sulphate, hydrated lead compounds and metallic lead pasted onto a lead alloy grid and wherein the paste mixture has an initial moisture content of about 13%, the steps comprising; soaking the plate in a confined space and under progressively increasing temperatures until the plate paste is reduced in moisture content to about 9%, aging the plates for a time sufficient to reduce the moisture content to about 4½% wherein the aging takes place in air, and then curing the plates in a closed chamber with steam at a pressure of about 30 pounds per square inch and for a period of about thirty minutes for recrystallizing yellow litharge from a portion of the plate paste and for causing a reaction between the paste and the grid for firmly adhering the paste to the grid.

4. In a method for curing negative pasted plates wherein the initial paste consists of a mixture of red litharge, basic lead sulphate, hydrated lead compounds and metallic lead pasted onto a lead alloy grid and wherein the paste mixture has an initial moisture content of about 13%, the steps comprising; heating the plate in a confined space so that the paste is soaked in a moisture ladened atmosphere provided by moisture being driven from the plate paste, progressively increasing the temperature of heat to a point that the plate paste is reduced in moisture content to about 9%, aging the plates for a time sufficient to reduce the moisture content to about 4½% wherein the aging takes place in air, and then curing the plates in a closed chamber with steam at a pressure of about 30 pounds per square inch and for a period of about thirty minutes for recrystallizing yellow litharge from a portion of the plate paste and for causing a reaction between the paste and the grid for firmly adhering the paste to the grid.

5. In a method for curing negative pasted plates wherein the initial paste consists of a mixture of red litharge, basic lead sulphate, hydrated lead compounds and metallic lead pasted onto a lead alloy grid and wherein the paste mixture has an initial moisture content of about 13%, the steps comprising; heating the plate in a confined space so that the paste is soaked in a moisture ladened atmosphere provided by moisture being driven from the plate paste, progressively increasing the temperature of heat to a point that the plate paste is reduced in moisture content to about 9%, aging the plates in air for a time sufficient to reduce the moisture content to about 4½%, and then heating the plates in steam under pressure and for a time and at a temperature sufficient to recrystallize yellow litharge in the plate paste and simultaneously to cause a chemical reaction between the basic lead sulphate and the grid.

WILLIAM D. CARSON.
ALVA L. HINDALL.

References Cited in the file of this patent

UNITED STATES PATENTS

| Number | Name | Date |
|---|---|---|
| 2,481,218 | Hindall | Sept. 6, 1949 |
| 2,553,192 | Hindall | May 15, 1951 |

OTHER REFERENCES

Transactions of Electrochemical Society, vol. 69 (1936), pages 233–242.